United States Patent
Sartor et al.

(10) Patent No.: US 9,667,940 B2
(45) Date of Patent: May 30, 2017

(54) ADAPTIVE COLORSPACE CONVERSION FOR 3D STEREOSCOPIC DISPARITY ESTIMATION

(71) Applicant: Sony Corporation, Minato-ku (JP)

(72) Inventors: Piergiorgio Sartor, Fellbach (DE); Thimo Emmerich, Stuttgart (DE)

(73) Assignee: Sony Corporation, Tokyo (JP)

( * ) Notice: Subject to any disclaimer, the term of this patent is extended or adjusted under 35 U.S.C. 154(b) by 251 days.

(21) Appl. No.: 14/344,010

(22) PCT Filed: Sep. 26, 2012

(86) PCT No.: PCT/EP2012/068912
§ 371 (c)(1),
(2) Date: Mar. 10, 2014

(87) PCT Pub. No.: WO2013/045468
PCT Pub. Date: Apr. 4, 2013

(65) Prior Publication Data
US 2014/0225983 A1    Aug. 14, 2014

(30) Foreign Application Priority Data
Sep. 26, 2011    (EP) .................................... 11182670

(51) Int. Cl.
*H04N 13/00* (2006.01)

(52) U.S. Cl.
CPC ..... *H04N 13/0022* (2013.01); *H04N 13/0025* (2013.01); *H04N 13/0037* (2013.01); *H04N 2013/0081* (2013.01)

(58) Field of Classification Search
CPC ............... H04N 13/00; H04N 13/0022; H04N 13/0037; H04N 13/0025; H04N 13/0081

USPC ..... 348/42, 43, 46, 51, 222.1, 241, 243, 244
See application file for complete search history.

(56) References Cited

U.S. PATENT DOCUMENTS

| | | | | |
|---|---|---|---|---|
| 8,077,205 | B2 * | 12/2011 | Berestov | .............. H04N 1/6033 348/180 |
| 9,008,457 | B2 * | 4/2015 | Dikmen | .................. G06T 5/008 382/274 |
| 2008/0309968 | A1 | 12/2008 | Berestov et al. | |
| 2009/0252411 | A1 | 10/2009 | Siddiqui et al. | |

(Continued)

FOREIGN PATENT DOCUMENTS

| CN | 101204097 A | 6/2008 |
|---|---|---|
| CN | 101945301 A | 1/2011 |

(Continued)

OTHER PUBLICATIONS

Combined Chinese Office Action and Search Report issued Jul. 3, 2015 in Patent Application No. 201280046719.8 (with English translation of categories of cited documents).

(Continued)

*Primary Examiner* — Trang U Tran
(74) *Attorney, Agent, or Firm* — Oblon, McClelland, Maier & Neustadt, L.L.P.

(57) ABSTRACT

A method for processing an image signal having at least two, preferably three channels, including: analyzing an information content of each channel, and converting the channels into a single channel using a weighting factor for each channel, wherein the weighting factors are adjusted dependent on information content of each channel.

20 Claims, 1 Drawing Sheet

(56) References Cited

U.S. PATENT DOCUMENTS

2010/0119149 A1    5/2010  Hong et al.
2011/0013828 A1    1/2011  Lipton et al.

FOREIGN PATENT DOCUMENTS

| EP | 1 993 293 A1 | 11/2008 |
| JP | 2009-89117 | 4/2009 |
| WO | WO 2006/137006 A2 | 12/2006 |

OTHER PUBLICATIONS

International Search Report issued Dec. 5, 2012, in PCT/EP12/068912 filed Sep. 26, 2012.
Written Opinion of the International Searching Authority issued Dec. 5, 2012, in PCT/EP12/068912 filed Sep. 26, 2012.
Pinhasov, et al., "Optimal Usage of Color for Disparity Estimation in Stereo Vision", URL: http://www.eurasip.org/Proceedinos/Eusipco/Eusipco2005/defevent/papers/cr1370.pdf, XP055045807, Sep. 8, 2005, 4 pages.
Mikulastik, "Verbesserung der Genauigkeit der Selbstkalibrierung einer Stereokamera mit 3D-CAD-Modellen", Universitat-Dissertation, XP002635672, Nov. 7, 2008, 107 pages.
Smit, et al., "Real time depth mapping performed on an autonomous stereo vision module", https://www.wageningenur.nl/en/Publication-details.htm?publicationId=publication-way-333337343335, Nov. 25-26, 2004, pp. 306-310.
Chang, et al., "Analysis of Color Space and Similarity Measure Impact on Stereo Block Matching", http://ieeexplore.ieee.org/xpl/articleDetails.jsp?arnumber=4746175, Nov. 30-Dec. 3, 2008, 4 pages.

* cited by examiner

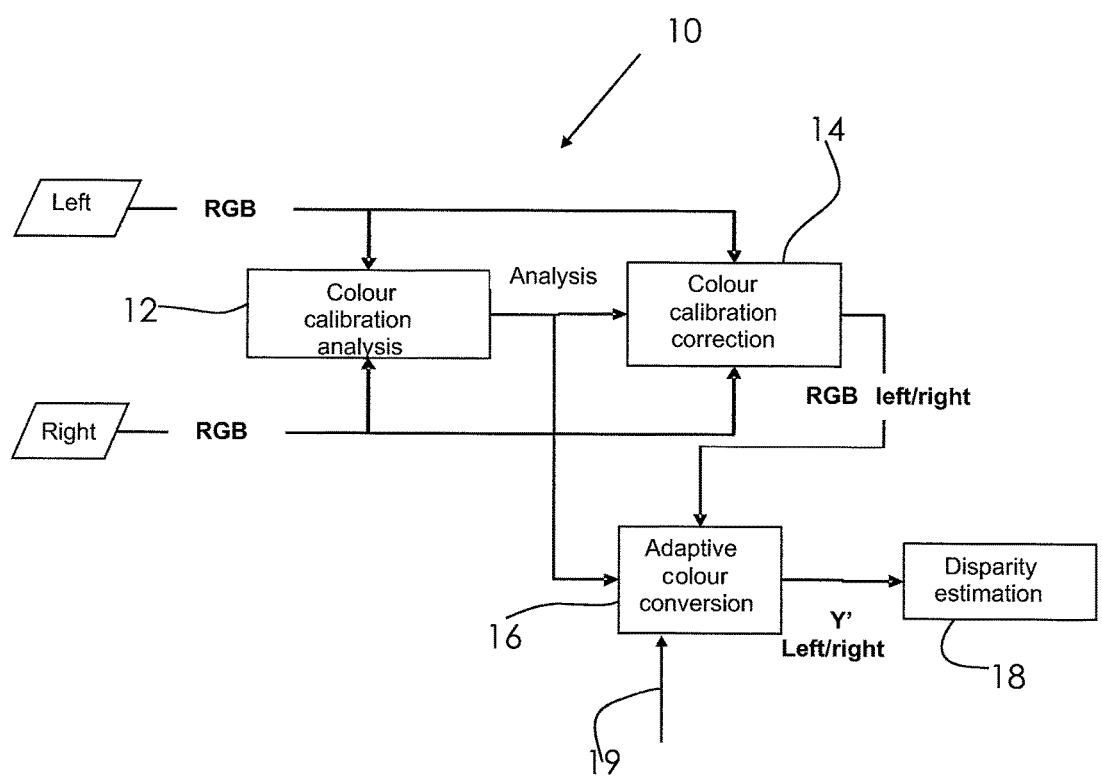

ADAPTIVE COLORSPACE CONVERSION FOR 3D STEREOSCOPIC DISPARITY ESTIMATION

CROSS-REFERENCE TO RELATED APPLICATIONS

The present application is based on PCT filing PCT/EP2012/068912 filed 26 Sep. 2012 and claims priority to European Patent Application, 11 182 670.7, filed in the European Patent Office, on Sep. 26, 2011, the entire contents of each of which being incorporated herein by reference.

FIELD OF INVENTION

The present invention relates to a method for processing an image signal having at least two, preferably three channels. The invention also relates to a device for processing an image signal and a computer program.

BACKGROUND OF THE INVENTION

In many 3D stereoscopic applications, so called disparity maps are calculated on the basis of two views supplied by two cameras, for example. A disparity map contains relative depth information gained by comparing two images. A disparity map is often necessary for specific processing steps used to improve the images presented to a user. One of the steps to calculate a disparity map is disparity estimation which can be seen as a correspondence search between two or more images, for example left and right images. Since each image comprises generally three channels, namely RGB or YUV channels, the correspondence search uses information from all channels of the left and right images. However, this requires complex hardware, e.g. large memory for storing all channels, and is time consuming. For cost reasons, there are systems using only one channel, typically the luminance (Y) channel of the images for the correspondence search.

Although the disparity estimation on the basis of a singlechannel, for example the luminance (Y) channel, works well in practice, there is a demand to further improve the disparity estimation step.

BRIEF SUMMARY OF INVENTION

It is an object of the present invention to provide a method for processing an image signal which allows to improve the disparity estimation. It is a further object of the present invention to provide a device for processing an image signal which supplies a signal allowing to improve the disparity estimation.

According to an aspect of the present invention there is provided a method for processing an image signal having at least two, preferably three channels, comprising the steps:
- analyzing an information content of each channel, and
- converting said channel into a single channel using a weighting factor for each channel, wherein said weighting factors are adjusted dependent on the information content of each channel.

This means in other words that the single channel which is gained from two or three channels, like RGB or YUV channels, is generated according to an adaptive scheme (in contrast to a fixed scheme in the prior art) dependent on the content of the image. For example, if one of the channels contains less information, the weighting factor for this channel is decreased when converting the channels into the single channel. As a result, the converted single channel comprises more information compared to a non-adaptive converting step which increases the performance of the following disparity estimation.

The necessary effort for implementing such a method is relatively low because a color calibration module, which is typically already present in a 3D display device, can be used. Such a color calibration module is usually required in order to bring the images which could have different color luminance and contrast due to different setups of cameras, to a similar level. A functionality of such a color calibration module is to analyze the images. This capability could also be used for analyzing an information content of each channel which is the basis for adjusting the weighting factors.

According to a further aspect of the present invention there is provided a device for processing an image signal having at least two, preferably three channels, comprising an analyzing unit adapted to analyze an information content of each channel, a converting unit adapted to convert said channels into a single channel using a weighting factor for each channel, and a weighting factor adjusting unit adapted to adjust the weighting factor of each channel dependent on the information content of each channel.

According to a further aspect of the present invention there is provided a computer program comprising program code means for causing a device to perform the steps of said method according to the present invention when said computer program is carried out on a device.

Preferred embodiments of the invention are defined in the dependent claims. It should be understood that the claimed device and the claimed computer program have similar and/or identical preferred embodiments as the claimed method and as defined in the dependent claims.

The present invention is based on the idea to convert for example the three RGB channels into one single channel using weighting factors which are dynamically adapted dependent on the information content of the channels. If an image for example comprises large portions of similar blue color (for example sky) the blue channel would comprise very low information so that the present invention gives this channel a reduced weight. As a result the other channels, for example R and G channels, are more dominant in the converted single channel. The performance of the disparity estimation using the single channel can thus be improved.

BRIEF DESCRIPTION OF DRAWINGS

These and other aspects of the present invention will be apparent from and explained in more detail below with reference to the embodiments described hereinafter. In the drawing FIG. 1 shows a block diagram for explaining the inventive method and the structure of the inventive device.

DETAILED DESCRIPTION OF THE INVENTION 3D stereoscopic devices, like TV sets, beamers, laptops, notebooks, personal computers, tablet computer, etc. have the capability to display 3D video content that consists of two image sequences, one for the left eye and the other for the right eye. The pixel-by-pixel displacement between the left and right eye images, called disparity, is directly related to the depth of the objects that the user perceives. Such 3D stereoscopic devices comprise circuitry for disparity estimation and/or to calculate disparity maps. Disparity maps, for example, are used to place text or graphic into 3D scenes, to generate new views or to adjust the depth of the scenes and objects to meet the viewer's comfort level. For example, when watching stereoscopic 3D content, a user may want to adjust the depth of the objects in the 3D scene in order to have a more pleasant and comfortable viewing experience.

On the basis of a disparity map, such depth adjustment could be performed.

The operation of a disparity estimation unit is generally known so that it is refrained from explaining it in detail. It could be summarized briefly as a correspondence search of content of one image in the other image of a left/right image pair. The determined displacement of the content in both images is then a measure for disparity.

The disparity estimation unit receives therefore the left and right images of an image pair. Due to the fact that an image is generally built up of several channels, like the RGB channels of an RGB video signal, in the best case the disparity estimation unit uses all channels of an image for disparity estimation.

However, due to cost reasons, it is also possible that the disparity estimation unit only receives one channel. This single channel is often the luminance channel Y which can be derived from the RGB channels on the basis of a fixed standardized scheme. In particular, the luminance channel is calculated as:

$$Y = W_r \cdot R + W_g \cdot G + W_b \cdot B$$

wherein R, G, B are the channels of the RGB signal and $W_r$, $W_g$ and $W_b$ are weighting factors defined for example in the standard ITU.BT601 or ITU.BT709.

In the ITU.BT601 standard, the weighting factors are for example $W_r = 0.299$, $W_b = 0.587$ and $W_b = 0.114$.

Using one single channel for disparity estimation which is derived from a three channel signal, the computation complexity, for example for disparity estimation can be reduced.

In the following, an improved way to generate a single channel from for example three channels defining an image is described with reference to FIG. 1.

In FIG. 1 a system is schematically shown in form of a block diagram which is provided to convert three channels of an image signal into one channel for further processing in a disparity estimation unit. Such a system could for example be part of an image processing system in a TV set, beamer, laptops, notebooks, personal computers, tablet computer, etc. In the FIGURE, the system is generally indicated with reference numeral 10. The system comprises a color calibration analysis unit 12, a color calibration correction unit 14, an adaptive color conversion unit 16 and a disparity estimation unit 18. It is without saying that the units 12 to 18 may be implemented in hardware and/or software.

Both, the color calibration analysis unit 12 and the color calibration correction unit 14 receive a left image and a right image as input signals. The supplied left and right images are in the present embodiment built up of three channels, namely an R-channel, an G-channel and a B-channel which together form the known RGB signal. As known in the art, the RGB signal is based on the RGB color model in which red, green and blue light is added together in various ways to reproduce a broad array of colors.

The color calibration analysis unit 12 and the color calibration correction unit 14 primarily serve the purpose to carry out a "color calibration" in order to bring the images of a left-right image pair to a similar level. Such color calibration is done because images might be captured by cameras with different setups so they can have different color, luminance and contrast. The result of the color calibration correction is then transmitted to other processing units of for example a TV set which, however, are not shown in the FIGURE.

The calibrated left and right images provided by the color calibration correction unit 14 are, as shown in the FIGURE, transmitted to the adaptive color conversion unit 16. This unit is adapted to convert the three channels of an image into one single channel which is then supplied to post-processing unit, for example the disparity estimation unit 18.

The conversion of the three channels is quite similar to the known conversion into a luminance signal as for example defined in ITU.BT601. In detail, each channel R, G, B is multiplied with a specific weighting factor $W_r$, $W_g$ and $W_b$, and the results are then summed to a single signal Y'. The respective equation is:

$$Y' = W_r \cdot R + W_g \cdot G + W_b \cdot B.$$

The standard conversion defines fixed weighting factors, namely $W_r = 0.299$, $W_g = 0.587$ and $W_b = 0.114$, wherein the sum of the three weighting factors is 1.

In the present embodiment, however, the weighting factors $W_r$, $W_g$ and $W_b$ are not predefined fixed values but are dynamically adapted dependent on the information content of an image. That is in other words the weighting factors are changed within the range of 0 to 1. In order to keep the sum of the weighting factors always to 1, the increase of a weighting factor of one channel always results in a decrease of at least one of the other weighting factors.

For example, if the information content of a channel 1 is I(1), of channel 2 I(2) and of channel n I(n), the weighting factors for each channel may be calculated as:

$$W_n = I(n)/\text{SUM}(I(1) \ldots I(n))$$

It is conceivable that upper and/or lower limits for each weighting factor are defined. For example, in the present embodiment an upper limit for $W_r$ and $W_b$ may be 0.5.

Generally, the determined adaptive weighting factors should reflect the information content of a channel. If a channel contains more information than the others, the respective weighting factor should be increased. If a channel contains less information, the respective weighting factor should be decreased. This kind of general rule is based on the assumption that the post-processing, for example the disparity estimation, can be improved if the single channel comprises as much information as possible.

For example, if an image contains large portions of the same color, for example a blue sky, the respective blue channel contains a great number of similar values and therefore less information. In such a case, the weighting factor is decreased. Hence, the weighting factor of at least one of the other channels is increased and gain more relevance in the converted single channel Y'.

As already described above, the system 10 comprises the color calibration analysis unit 12 which is primarily provided for equalizing both images with respect to color, luminance and contrast differences. The color calibration analysis unit 12 is for this reason adapted to analyze the left and right images in view of color, luminance and contrast.

This information can now be used also by the adaptive color conversion unit 16 which receives a respective analysis signal from the color calibration analysis unit 12. According to this analysis signal, the adaptive color conversion unit 16 adjusts the weighting factors for the converting step. It is to be noted that the weighting factors are the same for converting the left and right images, i.e. the RGB channels of both images.

For example, if the color calibration analysis unit 12 determines that the R-channel comprises less information, the normal weighting factor $W_r$ of 0.299 as defined in ITU.BT601 is decreased for example to $W_r=0.2$. The difference of 0.099 is then added to at least one of the remaining weighting factors $W_g$ and $W_b$ so that the sum of the weighting factors is still 1.

These adapted weighting factors are then applied to the three channels of the left and right images and a single channel Y' (one for the left image and one for the right image) is generated as an output of the adaptive color conversion unit 16 for the left image as well as for the right images. The single channel Y' which comprises information of the original channels RGB of an image is then supplied to the disparity estimation unit 18 for further processing.

However, it is also conceivable that the single channel Y' produced by the adaptive color conversion unit 16 is also used by another unit, for example a motion detection unit as to mention just one further example.

Further, it is to be noted that beside RGB channels as input to the adaptive color conversion unit 16 other channels could also be used to produce a single channel using adaptive weighting factors.

In the event that the single channel is used for motion estimation, the system 10 could also be provided in a 2D TV set for example, wherein the color calibration correction unit 14 would not be necessary any more. The adaptive color conversion unit 16 would only require the analysis signal from a color calibration analysis unit 12 which in the case of a 2D TV set receives only one image for analysis.

Further it is also conceivable that at least one of the weighting factors is adjusted or re-adjusted manually. For this purpose the adaptive colour conversion unit 16 comprises a respective input receiving an input signal designated with reference numeral 19.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for processing an image signal having at least two channels, comprising:
analyzing an information content of each channel, and converting said channels into a single channel using a weighting factor for each channel, wherein said weighting factors are adjusted dependent on the information content of each channel as a function of the information content of said each channel divided by a sum of the information contents of all of the channels.

2. The method of claim 1, wherein said channels are channels of an RGB signal.

3. The method of claim 1, wherein said converted single channel is a luminance channel.

4. The method of claim 3, wherein said image signal is a 3D image signal containing left and right images.

5. The method of claim 4, wherein said luminance channel is used for a disparity estimation step.

6. The method of claim 3, wherein said luminance channel is used for a motion estimation step.

7. The method of claim 1, wherein the weighting factor of a channel is increased if the information content in this channel is analyzed as higher than in the other channels, and the weighting factors of the other channels are decreased.

8. The method of claim 7, wherein the sum of said weighting factors is one.

9. The method of claim 8, wherein said weighting factors are manually adjustable.

10. The method of claim 1, wherein said step of analyzing is carried out during a step of color calibration.

11. A device for processing an image signal having at least two channels, comprising
circuitry configured to
analyze an information content of each channel,
convert said channels into a single channel using a weighting factor for each channel, and
adjust the weighting factor of each channel dependent on the information content of each channel as a function of the information content of said each channel divided by a sum of the information contents of all of the channels.

12. The device of claim 11, wherein said channels are channels of an RGB signal.

13. The device of claim 11, wherein said converted single channel is a luminance channel.

14. The device of claim 13, wherein said image signal is a 3D image signal containing left and right images.

15. The device of claim 13, wherein the circuitry is configured to perform disparity estimation using said luminance channel.

16. The device of claim 13, wherein the circuitry is configured to perform motion estimation unit using said luminance channel.

17. The device of claim 12, wherein the circuitry is adapted to increase the weighting factor of a channel if the information content in this channel is analyzed as higher than in the other channels, and to decrease the weighting factors of the other channels.

18. The device of claim 17, wherein the sum of said weighting factors is one.

19. The device of claim 12, wherein said circuitry is configured to allow manual adjustment of the weighting factors.

20. A non-transitory computer readable medium including computer program comprising program code for causing a device for processing an image to perform the method as claimed in claim 1 when said computer program code is carried out on the device.

* * * * *